(12) United States Patent
Shilo et al.

(10) Patent No.: US 7,870,109 B2
(45) Date of Patent: *Jan. 11, 2011

(54) METHOD AND SYSTEM FOR USE WITH THE INTERNET

(75) Inventors: Ronen Shilo, Gedera (IL); Dror Erez, Ramat Gan (IL); Gabriel Bilczyk, Tel Aviv (IL); Ehud Zagury, Kibbutz Netzer Sireni (IL); Guy Malachi, Rehovot (IL)

(73) Assignee: Condoit Ltd., Nes Tsiona (IL)

( * ) Notice: Subject to any disclaimer, the term of this patent is extended or adjusted under 35 U.S.C. 154(b) by 0 days.

This patent is subject to a terminal disclaimer.

(21) Appl. No.: 12/484,215

(22) Filed: Jun. 14, 2009

(65) Prior Publication Data

US 2009/0254835 A1    Oct. 8, 2009

Related U.S. Application Data

(63) Continuation of application No. 12/381,396, filed on Mar. 11, 2009, which is a continuation of application No. 11/053,662, filed on Feb. 9, 2005, now Pat. No. 7,529,766.

(51) Int. Cl.
  *G06F 7/00* (2006.01)
  *G06F 17/00* (2006.01)
(52) U.S. Cl. ..................... 707/695; 715/234
(58) Field of Classification Search ............ None
  See application file for complete search history.

(56) References Cited

U.S. PATENT DOCUMENTS

| | | | |
|---|---|---|---|
| 6,282,548 B1 | 8/2001 | Burner et al. | |
| 6,697,825 B1 | 2/2004 | Underwood et al. | |
| 6,778,975 B1 | 8/2004 | Anick et al. | |
| 7,054,830 B1 | 5/2006 | Eggleston et al. | |
| 7,185,333 B1 * | 2/2007 | Shafron | 717/173 |
| 7,475,346 B1 | 1/2009 | Bullock et al. | |
| 2001/0025280 A1 | 9/2001 | Mandato et al. | |
| 2001/0029527 A1 * | 10/2001 | Goshen | 709/218 |
| 2002/0065844 A1 | 5/2002 | Robinson et al. | |
| 2002/0198791 A1 * | 12/2002 | Perkowski | 705/26 |

(Continued)

*Primary Examiner*—Cam Y T Truong

(57) ABSTRACT

A method of increasing the awareness of users of the Internet to services and products provided by web sites, wherein the method includes establishing a hosting web site on the Internet having a data processor for registering web site owners (WSO's) as subscribers to a hosting service. The method also includes storing a program of a browser add-on in the web site, and incorporating a set of customizable characteristics, wherein each WSO subscriber is enabled on said hosting web site to customize said browser add-on for defining specific look and functionalities of the browser add-on. The method further includes registering WSO's as subscribers to the hosting service, providing the data processor with a data base for each WSO subscriber, storing the customization data of the browser add-ons in the data bases of the respective WSO subscribers, generating code to be integrated in a web site of the WSO, wherein the code includes a unique identifier of the customization data stored at the hosting web site, in the data base of the respective WSO subscriber. Whenever a user of the Internet activates the code in the WSO subscriber web site, another step provides downloading the browser add-on and the customized data related to the WSO subscriber from the data processor of the hosting web site to the personal computer (PC) of the Internet user and integrating the browser add-on in a web browser installed in the PC.

4 Claims, 7 Drawing Sheets

U.S. PATENT DOCUMENTS

| | | |
|---|---|---|
| 2003/0011641 A1 | 1/2003 | Totman et al. |
| 2003/0023524 A1 | 1/2003 | Sugimoto et al. |
| 2003/0061290 A1 | 3/2003 | Koch et al. |
| 2004/0061720 A1 | 4/2004 | Weber |
| 2004/0230676 A1 | 11/2004 | Spivack et al. |
| 2005/0278651 A1 | 12/2005 | Coe et al. |
| 2006/0036966 A1 | 2/2006 | Yevdayev |
| 2006/0074843 A1 | 4/2006 | Pereira |
| 2006/0095860 A1 | 5/2006 | Wada et al. |
| 2008/0005127 A1 | 1/2008 | Schneider |
| 2008/0109472 A1* | 5/2008 | Underwood et al. ........ 707/102 |

* cited by examiner

METHOD AND SYSTEM FOR USE WITH THE INTERNET

RELATED APPLICATIONS

This is a continuation of U.S. patent application Ser. No. 12/381,396, filed Mar. 11, 2009, which is a continuation of U.S. patent application Ser. No. 11/053,662, filed Feb. 9, 2005, now U.S. Pat. No. 7,529,766.

FIELD OF THE INVENTION

The present invention relates to a method and system for use with the Internet. The invention is particularly useful for increasing the awareness of users of the Internet to services and products provided by web site owners (WSO's). It is also useful for Internet communities, wherein the participants share areas of interest.

BACKGROUND OF THE INVENTION

Today, there are several known methods for causing Internet users to be aware of products and services of WSO's. One extensively used method is promoting with banners integrated in web pages or popping up when a web page is visited. There are Internet services which function as mediators between WSO's, who wish to promote themselves and WSO's willing to promote other WSO's services or products at their web sites. These mediators find the best match between WSO's of the two mentioned types, and are responsible for money transactions from promoted WSO's to promoting WSO's.

Another popular method is promoting web sites by search engines results. One type of search engine places search results according to the amount of a bid set by each WSO who wishes that his site would appear in the search results of a specific query. U.S. Pat. No. 6,778,975 to Anick, et al. describes a search engine for selecting targeted messages. Another type of search engine arranges search results according to the popularity of the WSO site. WSO's make a great competitive effort, including purchasing special web tools for locating their web sites' description in a higher position in the results list.

Other tools known on the Internet are browser add-ons. Often browser add-ons are created and provided by popular WSO's to be installed by Internet users. The browser add-ons are located at the top of the web browser, and provide functionality and look, which are usually related to the providing WSO.

A combination of the last two methods, described above, are browser add-ons functioning as dynamic search engines, automatically providing to an Internet user, a list of links to Internet pages, related to the contents of the visited web page, U.S. Pat. No. 6,282,548 to Burner et al. describes a method for generating and displaying metadata as supplemental information concurrently with the web page.

All these promotion methods require an investment of time and money from the WSO's, and have only a low efficiency. Only browser add-ons provide a constant connection with Internet users, who are likely to use the services of the WSO or purchase his products, and are offered only by large scale WSO's having the resources for generating and managing the browser add-ons.

Thus, there is a need for a method which will give every WSO the ability to be constantly and dynamically connected to Internet users. The method needs to provide a non-obtrusive way of promoting the products and services of the WSO, yet require from him minimal investment of time and money, and be user-friendly.

SUMMARY OF THE INVENTION

It is a principal object of the present invention to provide an innovative method and system for hosting web site owners (WSO's) wishing to increase the awareness of users of the Internet to services and products provided by them.

It is a further object of the hosting service of the present invention to provide WSO's with a web based, online, interactive environment for creating and modifying a private browser add-on, to be provided by them at their sites to users of the Internet.

A preferred embodiment of the present invention is a browser add-on in the form of a toolbar. Such a browser add-on is generally located at the top of the browser and becomes an integral part of it. The toolbar can be customized by a WSO, to include a set of adjusted functions based on a set of generic functionalities. Once the toolbar is installed by an Internet user, it interacts with the hosting service for part of its functionalities, as will be explained below.

One of the features of the toolbar, for powerful promotion of the WSO, is an integrated search engine, which dynamically gives sets of categorized, links to the Internet user. The links are associatively related to the contents of a currently visited web page. The hosting service provides a WSO with tools allowing him to integrate his services and products in relevant sets of categorized links, and to emphasize the links.

The hosting service also gives WSO's, with complementary products or services, the ability to work cooperatively, each of them allowing the others to promote their services and products at his toolbar, thus increasing the number of Internet users exposed to the promotions for each WSO.

According to a broad aspect of the present invention, there is provided a method of increasing the awareness of users of the Internet to services and products provided by web sites, comprising: establishing in the Internet a hosting web site having a data processor for registering web site owners (WSO's) as subscribers to a hosting service; storing in said web site a program of a browser add-on, incorporating a set of customizable characteristics, wherein each WSO subscriber is enabled in said hosting web site to customize said browser add-on for defining specific look and functionalities of the browser add-on; registering WSO's as subscribers to said hosting service; providing said data processor with a data base for each WSO subscriber; storing the customization data of said browser add-ons in the data bases of the respective WSO subscribers; generating code to be integrated in a web site of said WSO, said code includes a unique identifier of the customization data stored at the hosting web site, in the data base of the respective WSO subscriber; and whenever a user of the Internet activates said code in the WSO subscriber web site, downloading the browser add-on and the customized data related to said WSO subscriber from the data processor of the hosting web site to the PC of the Internet user and integrating said browser add-on in a web browser installed in said PC.

Further features and advantages of the invention will be apparent from the description below.

It is understood that while the preferred embodiment of the invention describes the web as using the current public standards for serving, transporting, and displaying information, this in no way limits the scope of the invention to those current standards.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
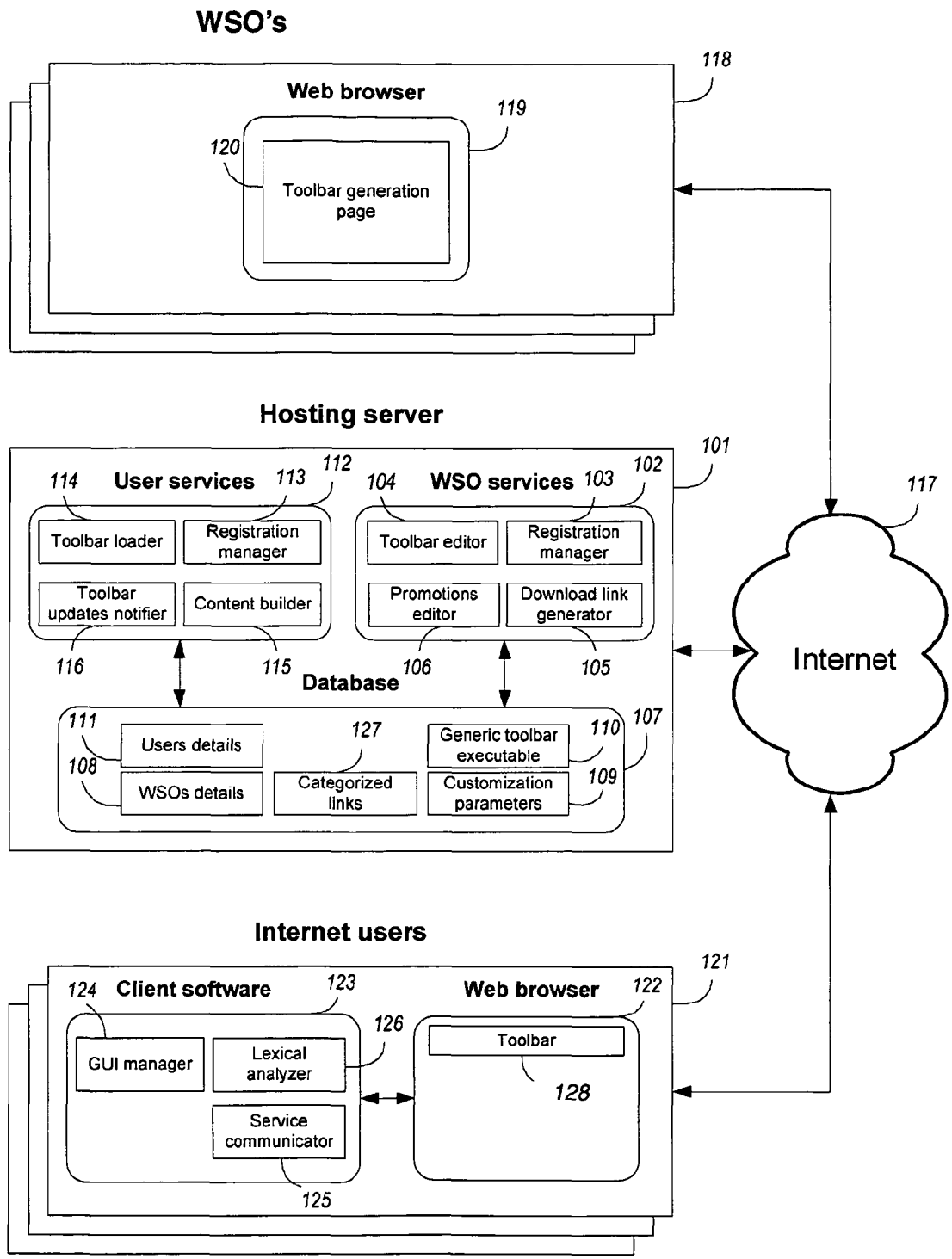
FIG. 1 is a schematic block diagram of the main modules of a preferred embodiment of the present invention.

FIG. 1 is a schematic block diagram of the main modules of a preferred embodiment, constructed according to the principles of the present invention. In general, a system implementing a preferred embodiment of the present invention is comprised of a hosting server 101 connected via the Internet (117) to personal computers (PC's) of web site owners (WSO's) 118 and to PC's of Internet users 121.

Hosting server 101 runs an application, comprising three main modules: a WSO services module 102, responsible for interacting with WSO's wishing to use the services of said hosting service; a users services module 112, responsible for interacting with users of the Internet during the toolbar installation process, and later for sending them data, messages and functionality updates; and a database 107 for storing all registration and customization data.

As mentioned, WSO services module 102 provides the functionality required to give WSO's the ability to create their customized toolbar and update it when desired. Registration manager 103 provides the interface, preferably HyperText Markup Language (HTML) pages, needed for the initial registration of WSO's to the hosting service. The registration details, which can be minimal, are stored at WSO details table 108. Each registered WSO is associated at the hosting server with a unique identifier, also stored at table 108.

Toolbar editor 104 is responsible for the process of customizing the toolbar for the first time by a registering WSO, or editing an existing toolbar by its owner. As already mentioned, the generic toolbar incorporates a set of generic functionalities. The customization process managed by toolbar editor 104 lets the WSO define the unique look and functionality of his toolbar, as will be explained below in detail. The customization data is stored at customization parameters table 109, and relates to the unique identifier of the WSO.

Promotions editor 106 is specifically responsible for the definition of services and products, which the registered WSO wishes to promote. The sets of promotions and their related keywords and Uniform Resource Locators (URL's) are also stored at customization parameters table 109, and are related to the unique identifier of the registered WSO.

Categorized links table 127, at database 107 holds sets of messages, defining or promoting sites, and their related URL's. These messages are grouped into categories, and each category associated with a set of representing keywords.

Download link generator 105 generates the link that the registering WSO is supposed to integrate in its site. This link directs the Internet user to the hosting server, and includes the unique identifier earlier allocated for the registering WSO.

User services module 112 provides the functionality required to give users of the Internet the ability to download a desired toolbar; and after the toolbar is installed, to dynamically and automatically provide its software with relevant data, messages and customization updates.

Registration manager 113 provides the interface needed for the installation of the toolbar software to the PC of an Internet user. Registration manager 113 optionally stores the details of the registering user at user details table 111, and activates a toolbar loader 114, passing the address of the user and the unique identifier of the WSO which owns the required toolbar.

Toolbar loader 114 is responsible for the actual process of sending the customized toolbar to the PC of the Internet user, via the Internet. As mentioned, toolbar loader 114 is aware of the unique identifier of the desired toolbar owner, and sends to the requesting user both the generic toolbar executable 110, which is stored at database 107, and the specific customization data received from customization parameters table 109, according to said unique identifier.

Each time a user who installed a toolbar of the present invention visits a web page in his browser, content builder 115 receives a message from the toolbar application, comprising both the URL of the visited page, and a set of keywords representing the contents of the visited page. As will be described in detail in FIG. 5, content builder 115 builds a message, using for instance the Extensible Markup Language (XML) format, which contains categorized data related to the contents of the visited page, and the promoted services and products of the WSO who owns the toolbar, which their associated keywords match the set of keywords representing the contents of the visited page.

Toolbar updates notifier 116 is responsible for sending a notification to relevant toolbars, whenever a WSO updates the look and functionality of its owned toolbar. The notification message is sent the first time the user activates its toolbar after the update was made; the notification message includes, for instance in XML format, the customization parameters of the updated toolbar.

WSO's can register the hosting service of the present invention via a PC 118, connected to the Internet. Using web browser 119, the WSO goes to the URL of the hosting service, starting at toolbar generation page 120, and continuing afterwards with the registration process and the customization of the toolbar. WSO's also reach this URL later for updating their toolbar.

As mentioned, an Internet user can download a toolbar of the present invention from web browser 122, installed in PC 121. After toolbar 127 is installed and activated, it is integrated in web browser 122.

Client software 123 is responsible for the activation of toolbar 127, and for the communication with user services module 112 of the hosting server 101.

GUI manager 124 is responsible to display the toolbar and for interaction with the user. According to the current customization parameters, GUI manager 124 displays the defined icons and boxes. It also provides the functionality of each icon and search box, links to the related URL and passes parameters when required.

Service communicator 125 interacts with user services module 112 at hosting server 101, whenever required. It is responsible for sending the URL and representing keywords whenever a new page is visited, and to get data, messages and updates from user services module 112. Service communicator 125 is also responsible for comparing a newly received customization version to the current one, to decide if the customization parameters of the toolbar should be updated.

Lexical analyzer 126 gets the contents of each visited web page, and fetches therefrom the contents a set of keyboards, weighted according to their dominance in the page. These weighted keywords are passed to service communicator 125, sent by it to content builder 115.

Figure 2:
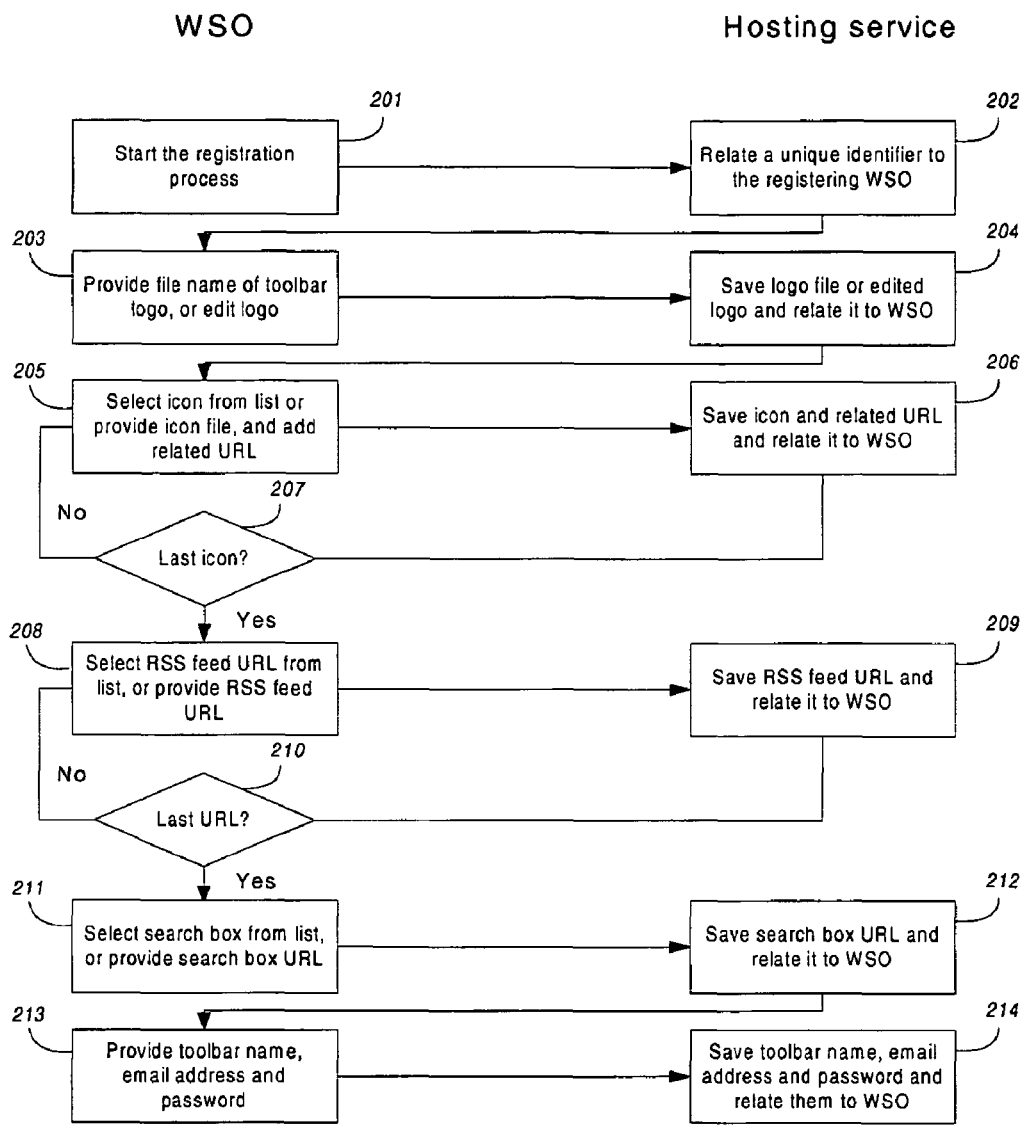
FIG. 2 is a schematic flowchart of the toolbar customization process, performed by a WSO at the hosting web site.

FIG. 2 is a schematic flowchart of the toolbar customization process, performed by a WSO at the hosting web site, according to the principles of the present invention. Typically, the process is performed by a wizard, guiding the WSO through the steps of the toolbar customization. The WSO may define the look, position and customized functionality of each of the set of generic functionalities provided by the hosting service.

First, the registering WSO starts the registration process at the hosting web site (block 201). The hosting service relates a unique identifier to the WSO (block 202). Then, the registering WSO defines a logo for the toolbar (block 203). The logo can be either edited through the web site of the hosting service, or alternatively the WSO can provide a path of a file in his PC, to be used as the logo of the toolbar. The WSO also associates a URL and an optional tooltip with the logo. The hosting service saves the logo at customization parameters table 109 of FIG. 1 (block 204), and associates it with the unique identifier set for the WSO at the beginning of the process.

Then, the registering WSO defines one or more icons for the toolbar (block 205). As for the logo, each icon can be either edited through the web site of the hosting service, or alternatively the WSO can provide a path of a file in his PC. The WSO also associates a URL with each icon, linking to a web page, which a web browser will be directed to when the matching icon is clicked. The hosting service saves the icons at customization parameters table 109 of FIG. 1 (block 206), and associates them with the WSO unique identifier. The process is repeated for all defined icons (block 207).

The registering WSO is also able to define one Rich Site Summary (RSS) feed or more to be integrated in the toolbar (block 208). RSS is commonly used protocol for syndication and sharing of content. The RSS feed can be chosen from a pre-defined set of feeds provided by the hosting service, or as a URL provided by the registering WSO. RSS feed definition will integrate a menu in the toolbar with the RSS feed items, automatically updated according to the feed updates. The hosting service saves the URL of the RSS feed URL at customization parameters table 109 of FIG. 1 (block 209), and associates it with the WSO unique identifier. The process is repeated for all defined RSS feeds (block 210).

The registering WSO can also define a search box to be integrated in the toolbar (block 211). The related search engine can be chosen from a pre-defined set of search engines provided by the hosting service, or as a URL linking to another search engine provided by the registering WSO. The hosting service saves the defined search box URL at customization parameters table 109 of FIG. 1 (block 212), and associates them with the WSO unique identifier.

Finally, the registering WSO provides the toolbar name, a password and optionally an email address (block 213). These parameters are used to identify the toolbar, and the owning WSO when an update is desired.

Figure 3:
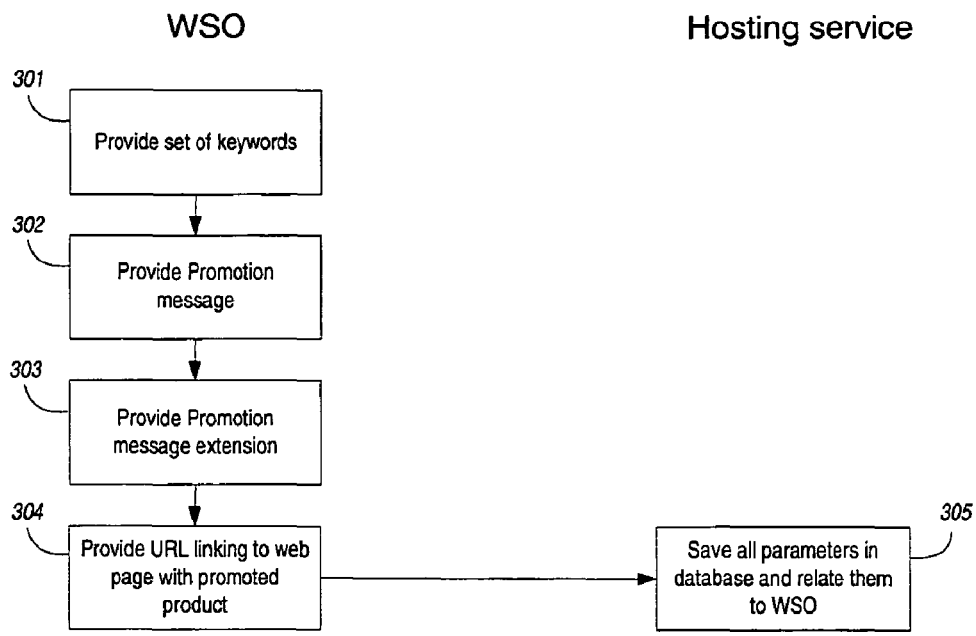
FIG. 3 is a schematic flowchart illustrating the process where a WSO provides details of the products and/or services he wishes to promote via the toolbar of the present invention.

FIG. 3 is a schematic flowchart illustrating the process wherein a WSO provides details of the products and/or services he wishes to promote via the toolbar, according to the principles of the present invention. The WSO specifies a set of keywords best matching the nature of the product or service he wishes to promote (block 301). Then he provides a promotion message (block 302) to be displayed to a user having the toolbar, when the user visits a web page, wherein the keywords representing the web page match the set of keywords specified by the WSO. The WSO may also provide a promotion message extension (block 303). This extension is displayed as a tooltip when the user rolls over said promotion message. Finally, the WSO defines the URL wherein the relevant service or product are described (block 304), such that when the user clicks on the promotion message, its browser is directed to the page defined, by the URL. All said parameters are received by promotions editors 106 of FIG. 1, and stored at customization parameters table 109, related to the registering WSO according to its unique identifier (block 305).

Figure 4:
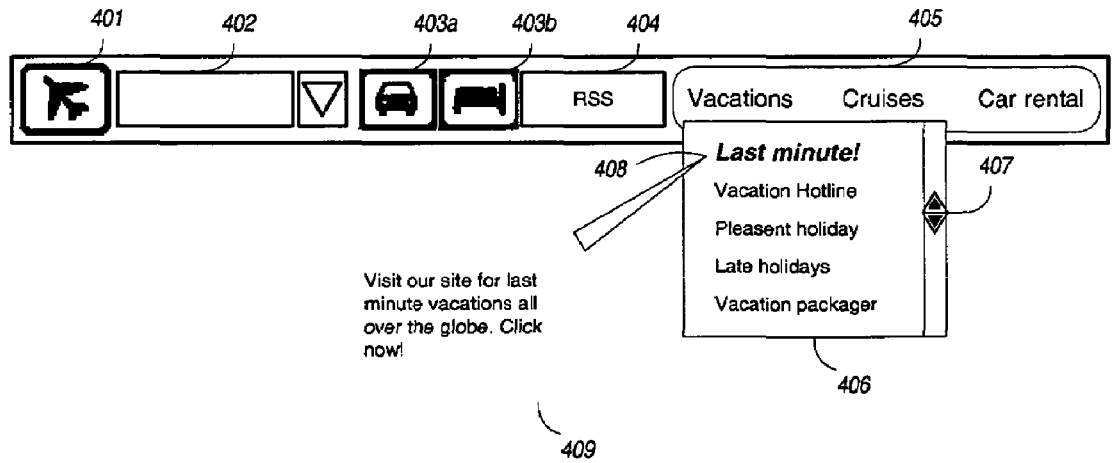
FIG. 4 schematically illustrates a web browser add-on, implemented as a toolbar, and constructed according to the principles of the present invention.

FIG. 4 schematically illustrates a web browser add-on in the form of a toolbar, as an exemplary embodiment of the present invention. In this example, the toolbar is customized by a web site dealing with travel activities. Logo 401 typically reflects the nature or market of the WSO, in this case shaped as an airplane. The toolbar also integrates a search box 402, which may be directed to a local search at the WSO site, as well as icons 403*a* and 403*b*, shaped as a bed and a car, linking to major sections at the travel site—hotels and a car rental respectively. RSS feed 404 may be linked to an RSS feed dealing with travel related news and reports.

Area 405 of the toolbar is where the categorized data appears. In this example, when the user visits a site related somehow to travel, three categories appear: "Vacations," "Cruises" and "Car rental." Each displayed category acts as a menu. When the category is clicked, a scrollable (406-407) menu is opened, having a list of related sites, products and services. A promotion of the toolbar owner 408—"Last minute!"—for which its keywords match the representing keywords of the visited page, is placed at the top of the list. When the user rolls over it he will see tooltip 409, telling more about the promoted service. When the promotion is clicked, the user's browser is directed to the page of the WSO site dealing with "last minute" offers.

Figure 5:
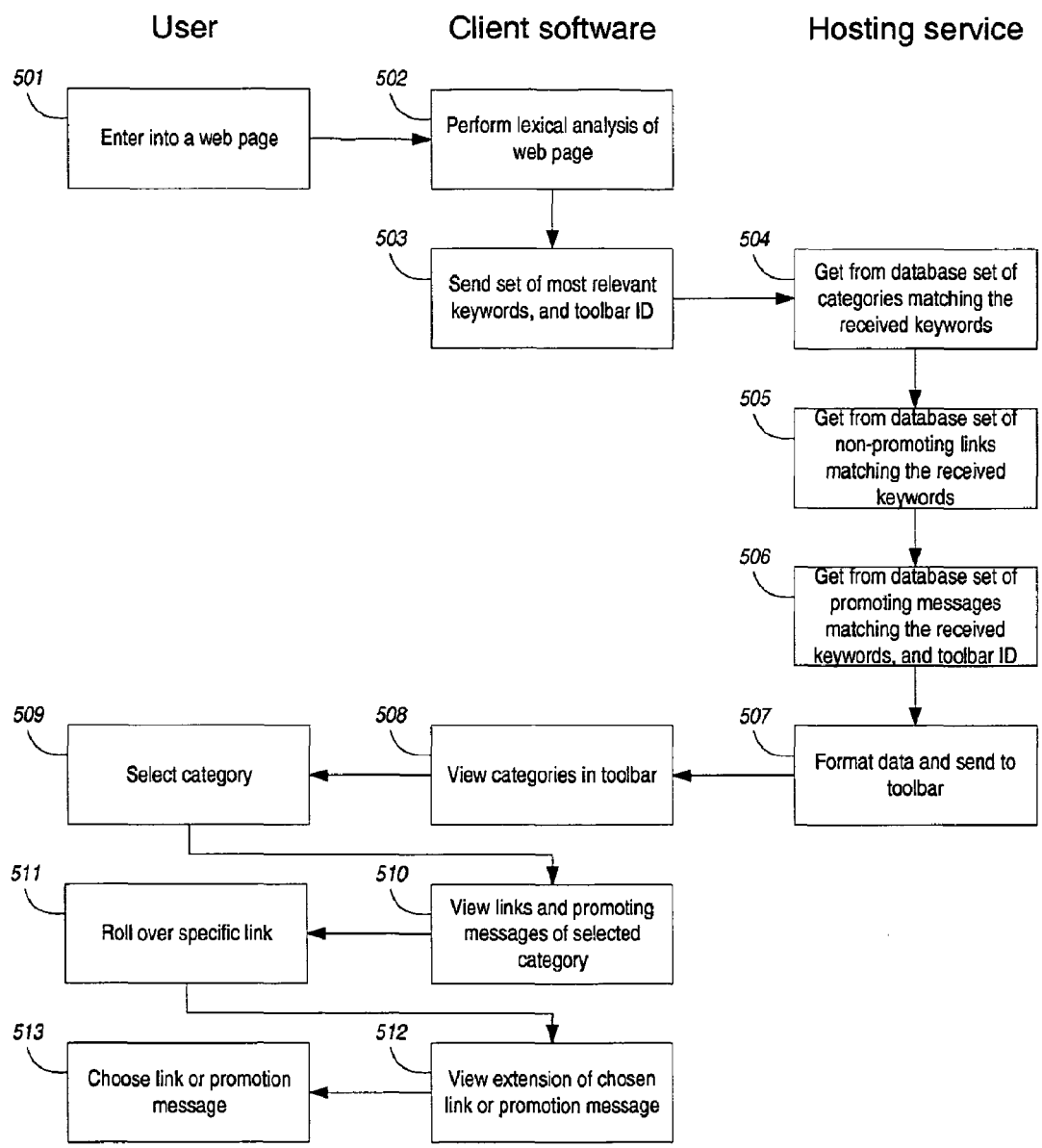
FIG. 5 is a schematic flowchart describing the process wherein an Internet user, having the toolbar of the present invention, visits a web page, and automatically receives, via the toolbar, content that is related to the contents of the visited page, wherein the received content includes promoted services and/or products of the WSO, to which said toolbar is related.

FIG. 5 is a schematic flowchart describing the process wherein an Internet user, having the toolbar of the present invention, visits a web page, and automatically receives content that is related to the contents of the visited page via the toolbar, according to the principles of the present invention. The content includes promoted products and/or services of the WSO for which the toolbar relates to him.

Whenever the user visits a web page in the web browser (block 501), Lexical analyzer 126 of FIG. 1 at the client software of the toolbar performs lexical analysis on the contents of the page. The result of the analysis is a weighted set of representative keywords (block 502). The set of keywords is then sent, along with the WSO unique identifier (block 503), by service communicator 125 (FIG. 1) via Internet 117 to content builder 115. Content builder 115 then gets a set of categories matching said set of keywords from categorized links table 127 at database 107 (block 504). For each category it gets a list of related links from database 107 (block 505). Then it searches for promotions defined by the toolbar owner. Their related set of keywords also matches the set of representing keywords (block 506). The data, including the categories names, messages, promotions, extensions and related URL, are formatted in XML and sent to the requesting client software, according to its Internet Protocol (IP) address (block 507).

GUI manager 124 of FIG. 1 automatically displays the categories in the toolbar, at area 405 of FIG. 4 (block 508). When the user selects a category (block 509), GUI manager 124 displays the set of messages related to the selected category (block 510). When the user rolls over a specific message (block 511), the extension of the message is displayed (block 512). Then the user can click on a message (block 513) in order to be directed by the related. URL to the related web page.

Figure 6:
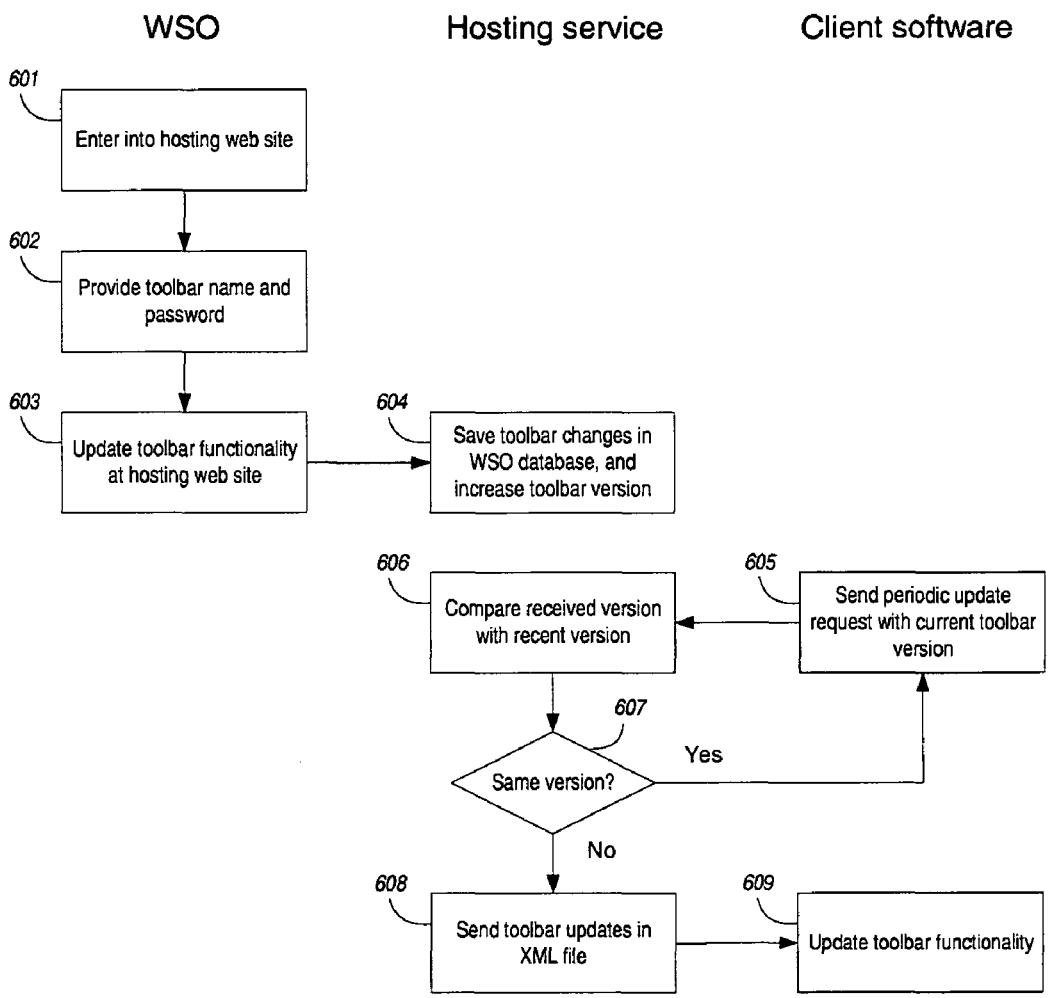
FIG. 6 is a schematic flowchart illustrating the process of an automatic update of a toolbar, according to the principles of the present invention.

FIG. 6 is a schematic flowchart illustrating the process of automatic update of a toolbar, according to the principles of the present invention. The WSO who owns a toolbar goes to the hosting service web site (block 601), and provides its toolbar name and password (block 602) for identification. Then, using the wizard, he updates the toolbar functionality (block 603). Toolbar editor 104 of FIG. 1 saves the changes at customization parameters table 109 (block 604), and increases the version number of the toolbar.

The client software periodically sends the hosting server a request to check for updates (block 605), comparing the current version of the toolbar at the user with the most updated version at the server (block 606). This can be also done each time the user activates the toolbar. If the version is not the same (block 607), the toolbar updates notifier 116 (FIG. 1) at the hosting server. Notifier 116 sends the toolbar update in the XML based message to service communicator 125 (block 608), and the client software updates the toolbar look and functionality (block 609).

Figure 7:
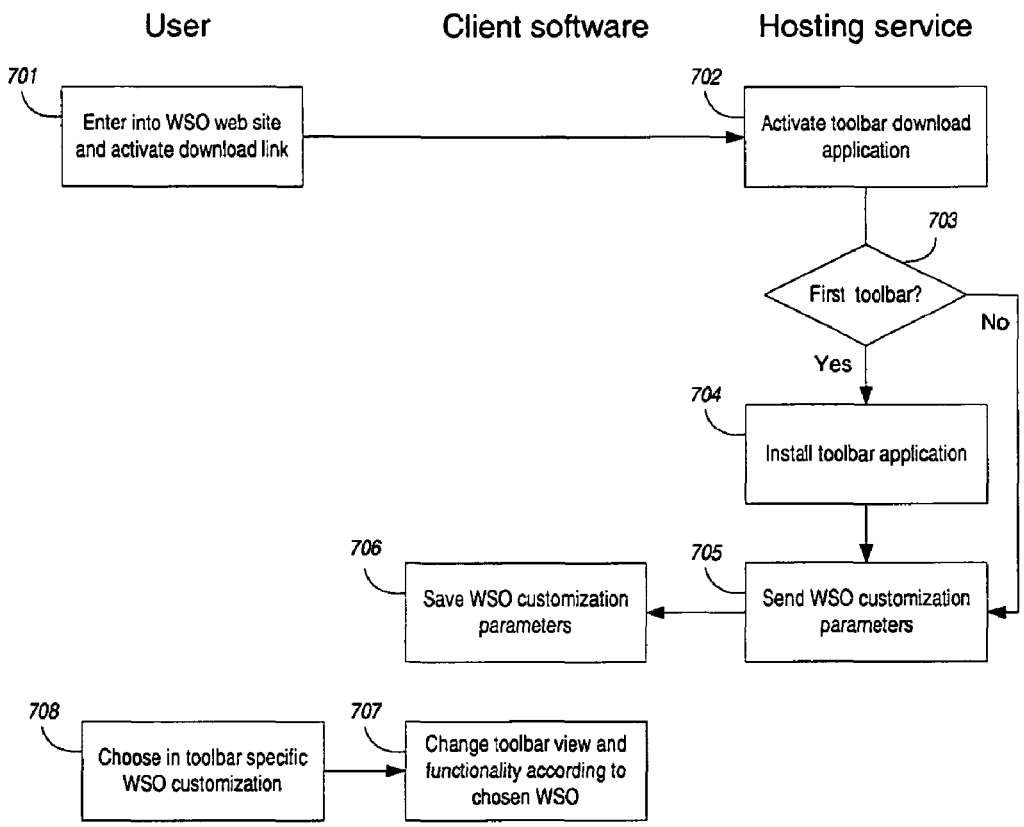
FIG. 7 is a schematic flowchart illustrating how an Internet user, who installed the toolbar of the present invention from more than one WSO, switches between the two toolbars, according to the principles of the present invention.

FIG. 7 is a schematic flowchart illustrating how an Internet user, who installed the toolbar of the present invention from more than one WSO, switches between two toolbars, according to the principles of the present invention. A user enters the site of a WSO and activates the download link at the site (block 701). Toolbar loader 114 (FIG. 1) is then activated (block 702), checking if a previous toolbar was already installed by the user (block 703). If the answer is negative, the client software is downloaded to the user's PC and installed (block 704), and customization parameters of the specific toolbar are sent to the user's PC (block 705). If the client software always resides at the user's PC, the new customization parameters are saved as well, each set of customization parameters associated with a unique WSO identifier (block 706).

Now, having more than one set of toolbar customization, the user is able to switch the view and functionality of the toolbar from one WSO toolbar to the other (block 707-708). This may be achieved by a menu of toolbar names integrated in the toolbar, containing the list of WSO toolbar customizations installed by the user.

It is to be understood that the phraseology and terminology employed herein are for the purpose of description, and should not be regarded, as limiting.

It is important, therefore, that the scope of the invention is not construed as being limited by the illustrative embodiments set forth herein. Other variations are possible within the scope of the present invention as defined in the appended claims and their equivalents.

We claim:

1. A method executed at a hosting site, said method comprising the steps of:
the hosting site receiving from a web site owner (WSO) that provides products information to register said WSO with said hosting site;
establishing identifier (ID) information for said WSO;
said hosting site guiding said WSO to create customization data representing a set of customization characteristics, which data is configured to be combined with a program module that creates an add-on element within a window of a browser of a computer, and which data imparts specific look and functionalities to said add-on element;
said hosting site storing the created customization data, in a manner that:
(a) provides for downloading said customization data to said computer that contains said program module, in response to said computer requesting said customization data,
(b) permits modifying said customization data when said ID information is supplied, and
(c) receives periodic requests from said computer to check for updates;
comparing a current version of the add-on element at said computer with the most updated version of the add-on element at the hosting site, and, if the current version of the add-on element is not the same with as the most updated version of the add-on element, sending an add-on element update message for updating the add-on element's look and functionality;
storing changes of customization data in a customization parameters table; and
increasing version number of the add-on element;
wherein the customization parameters table includes one or more from a set that includes logo, Rich Site Summary (RSS) feeds, search boxes, icons, messages, promotions, extensions, and related Uniform Resource Locators (URLs); and wherein the step of storing changes of customization data is based on the comparing.

2. A method executed at a hosting site comprising the steps of:
the hosting site receiving from a web site owner (WSO) that provides products or services information to register said WSO with said hosting site;
establishing identifier (ID) information for said WSO;
said hosting site guiding said WSO to create customization data representing a set of customization characteristics, which data is configured to be combined with a program module that creates an add-on element within a window of a browser of a computer, and which data imparts specific look and functionalities to said add-on element;
said hosting site storing the created customization data, in a manner that:
(a) provides for downloading said customization data to computer that contains said program module, in response to said computer requesting said customization data, (b) permits modifying said customization data when said ID information is supplied, and (c) provides for re-downloading said customization data to said computer in response to a request;

comparing a current version of the add-on element at said computer with the most updated version of the add-on element at the hosting site, and, if the current version of the add-on element is not the same with as the most updated version of the add-on element, sending an add-on element update message for updating the add-on element's look and functionality;

storing changes of customization data in a customization parameters table; and increasing version number of the add-on element; wherein the customization parameters table includes one or more from a set that includes logo, Rich Site Summary (RSS) feeds, search boxes, icons, messages, promotions, extensions, and related Uniform Resource Locators (URLs); and wherein the step of storing changes of customization data is based on the comparing.

3. The method of claim 2 where said re-downloading in response to said request is executed when the customization data that is stored in said hosting site is an updated version of the customization data that was previously downloaded to said computer.

4. A method executed at a hosting site comprising the steps of:

the hosting site receiving from a web site owner (WSO) that provides products or services information to register said WSO with said hosting site;

said hosting site guiding with said WSO to create customization data that, when combined with an add-on program module that is incorporated in a browser program that is executed within a computer, appears as an add-on element within a window generated by the browser program, wherein (a) information in the customization data imparts characteristics to the add-on element as chosen by the WSO in course of said guiding and (b) the add-on program module comprises code that causes a request to be sent to the hosting site to upload to said computer said customization data;

establishing identifier (ID) information for said WSO;

said hosting site storing the created customization data in a database, in association with an identifier that is at least a part of said ID information, to thereby create a presence of said WSO at said hosting site, which presence enables a party that presents a request that includes said identifier to modify said customization data in said database;

comparing a current version of the add-on element at said computer with the most updated version of the add-on element at the hosting site, and, if the current version of the add-on element is not the same with as the most updated version of the add-on element, sending an add-on element update message for updating look and functionality of the add-on element;

storing changes of customization data in a customization parameters table; and increasing version number of the add-on element;

wherein the customization parameters table includes one or more from a set that includes logo, Rich Site Summary (RSS) feeds, search boxes, icons, messages, promotions, extensions, and related Uniform Resource Locators (URLs); and wherein the step of storing changes of customization data is based on the comparing.

* * * * *

UNITED STATES PATENT AND TRADEMARK OFFICE
CERTIFICATE OF CORRECTION

| | | |
|---|---|---|
| PATENT NO. | : 7,870,109 B2 | Page 1 of 1 |
| APPLICATION NO. | : 12/484215 | |
| DATED | : January 11, 2011 | |
| INVENTOR(S) | : Ronen Shilo et al. | |

It is certified that error appears in the above-identified patent and that said Letters Patent is hereby corrected as shown below:

Cover page of patent item (73), Assignee name (Condoit Ltd.) is spelled incorrectly. It should appear as follows;

Assignee: Conduit, Ltd.

Signed and Sealed this
Eighth Day of March, 2011

David J. Kappos
*Director of the United States Patent and Trademark Office*